Sept. 17, 1963      B. SUMMERS      3,103,914

FLUID CIRCULATION SYSTEM

Filed Jan. 5, 1962      2 Sheets-Sheet 1

INVENTOR.
Basil Summers
BY Jacobi & Davidson
ATTORNEYS.

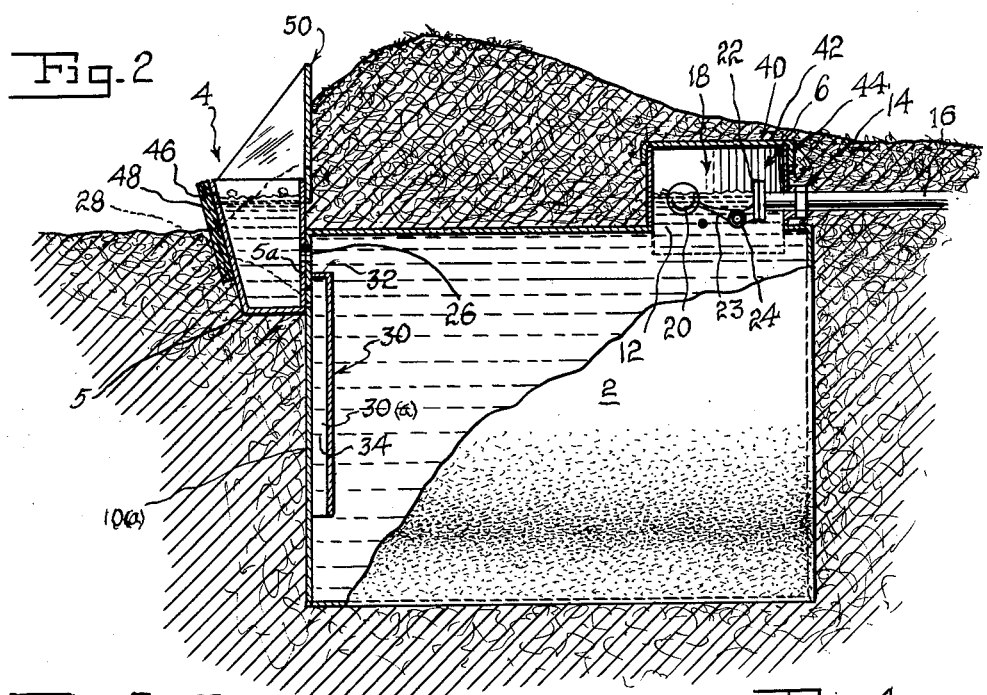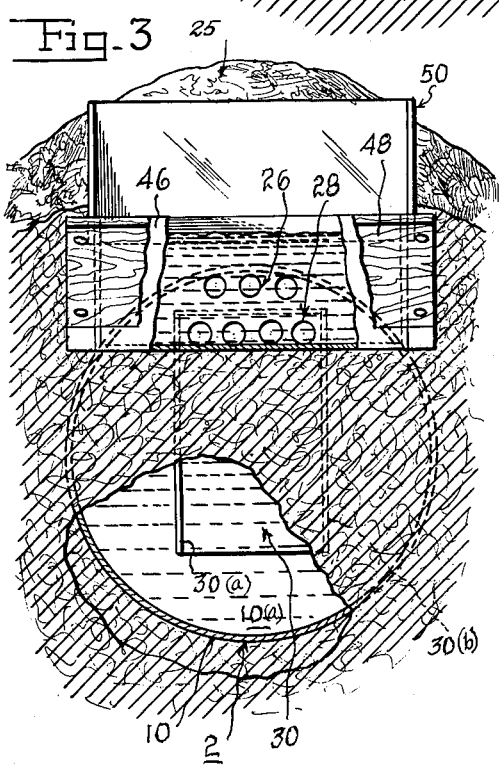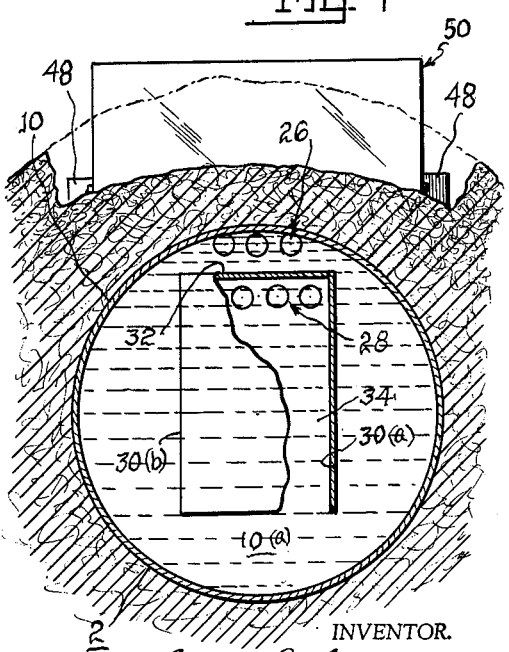

United States Patent Office 3,103,914
Patented Sept. 17, 1963

3,103,914
FLUID CIRCULATION SYSTEM
Basil Summers, Macomb, Mo.
Filed Jan. 5, 1962, Ser. No. 164,501
9 Claims. (Cl. 119—73)

This invention relates to fluid circulation systems, and in particular to such systems of the thermo-dynamic type incorporating a plurality of separate chambers between which fluid circulation is achieved.

This invention finds particular utility in the construction and fabrication of animal watering trough systems, and for this reason is described herein as applied to such use. However, it should be understood from the outset that the present invention can be applied, and is adaptable, to other applications where undue agitation is undesirable, such as, for example, the compounding of volatile substances, and/or the controlled growth of cultures.

Various types of thermo-dynamic circulation systems have heretofore been proposed, and specific prior suggestions have been made as to the manner in which thermo-dynamic principles can be utilized for purposes of maintaining a continuous circulation of fluid within a feeding trough or the like. In accordance with certain prior suggestions, a storage chamber and a trough chamber are provided, and some baffle means is incorporated between the chambers so as to allegedly maintain a continuous circulation therebetween due to thermal differences within the respective chambers. Such prior systems are subject to operating disadvantages and fallacies, and thus, notwithstanding the prior suggestions, there remains a need for an efficient and continuously operative thermo-dynamic water trough system adapted to have substantially all of the components thereof submerged underground.

Accordingly, one of the primary objects of the present invention is to satisfy the aforesaid need by providing a fluid circulation system adapted for use in a watering trough arrangement which can be easily manufactured to yield trouble-free operation over extended periods of time. Still further, in this connection, a primary object of the present invention is to provide such a system which lends itself to the fabrication of a low-cost arrangement which can be made available to the average farmer or rancher.

Additionally, and possibly more important in basic nature, the invention has as another of its primary objects, the provision of a chambered fluid circulation system having fluid transfer passageways so disposed therein as to insure continued circulation when only the slightest temperature differential exists between respective portions thereof.

Supplemental, but particularly significant specific objects of the present invention, are: (a) to provide an underground chamber fluid circulation system conforming with the preceding objects, and adapted to provide for automatic circulation of fluid therein through a single exposed component thereof in the form of a drinking fountain; (b) to provide such a system which can be fabricated from existing materials, and in accordance with existing manufacturing techniques so as to be available for sale at a comparatively low price; (c) to provide such a system wherein the inlet and outlet ports thereof as well as the fluid circulation passageways therein are so disposed and arranged as to induce a fluid circulation even in the event ice has formed, or is forming, at the exposed surface of the fountain or drinking trough; (d) to provide such a system which can be easily installed in field position without requiring particular final adjustment of relative positions between the component parts thereof; (e) to provide such a system which automatically refills so that further attention of the owner or operator is not required once the component parts have been properly installed underground; (f) to provide such a system wherein oxidation is not required for circulation, or even desired; (g) to provide such a system wherein the drinking fountain or trough chamber thereof is free of any movable components which can injure an animal drinking therefrom; (h) to provide such a system which is sanitary at all times under operating conditions and eliminates the tendency for waste to drop therein; (i) to provide such a system which affords access to the component parts thereof after the same has been installed below ground whereby the system can be easily cleaned; (j) to provide such a system which utilizes to the maximum extent the inherent underground temperatures; (k) to provide such a system wherein the drinking trough or fountain is constantly cleaned of any wastes which may accidentally fall therein; (l) to provide such a system which incorporates but one moving part, namely a float actuated valve adapted to control liquid level within the driking fountain portion thereof; (m) to provide such a system which will accommodate all sizes of livestock, which is adaptable to poultry needs, and which may be installed with curbings to accommodate only larger animals if desired; (n) to provide such a system which is operative under all weather conditions, and during different seasons of the year; (o) to provide such a system wherein the fountain portion thereof is remote from the movable valve and inlet thereof whereby operating noises do not frighten timid animals; (p) to provide such a system incorporating component parts which can be installed inside or outside of sheds or buildings, and which can be installed in out-of-the-way areas and yet remain fully automatic in operation.

In accordance with the preferred embodiment thereof, a chamber fluid circulation system adapted to provide for automatic circulation of fluid therein due solely to thermal differences in such fluid comprises a storage chamber, an inlet chamber extending vertically above and communicating with the storage chamber, first passageway means for communicating a first vertical level of the trough chamber with a first vertical level of the storage chamber, and second passageway means for communicating a second and higher vertical level of the trough chamber with a second and higher vertical level of the storage chamber whereby when the inlet chamber is filled with liquid to a level above the storage chamber, the trough chamber is filled to the desired level, the storage chamber is completely filled, and when the liquid in the trough chamber has a temperature different than the temperature of liquid in the storage chamber, liquid circulates from the storage chamber through the second passageway means to the trough chamber, and from the trough chamber through the first passageway means to the storage chamber.

The invention will be better understood, and objects other than those specifically set forth above will become apparent when consideration is given to the following detailed description. Such description refers to the annexed drawings presenting preferred and illustrative embodiments of the invention. In the drawings:

FIGURE 2 is a partially sectional side view, taken on a medial longitudinal vertical plane and presenting the preferred disposition of certain system components and passageways;

FIGURE 3 is a transverse view, partially in section, taken on the line 3—3 of FIGURE 1;

FIGURE 4 is also a transverse view, partially in section, but taken on the line 4—4 of FIGURE 1;

Figure 1:
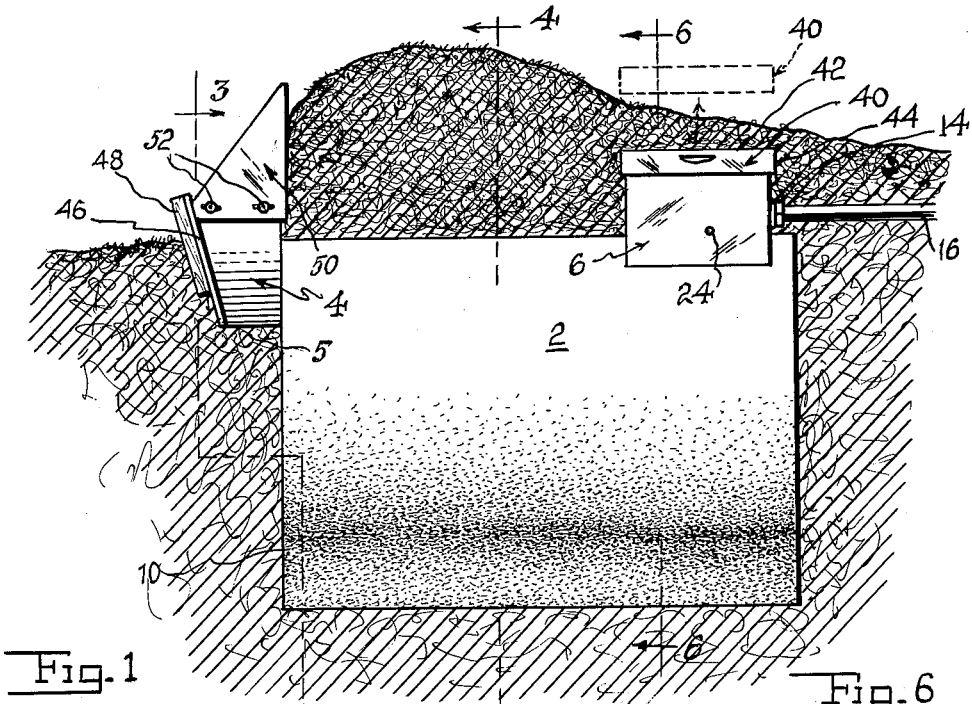
FIGURE 1 is a side view of a fluid circulation system constructed in accordance with the present invention and presents the same as submerged below ground.
Figures 5, 6:
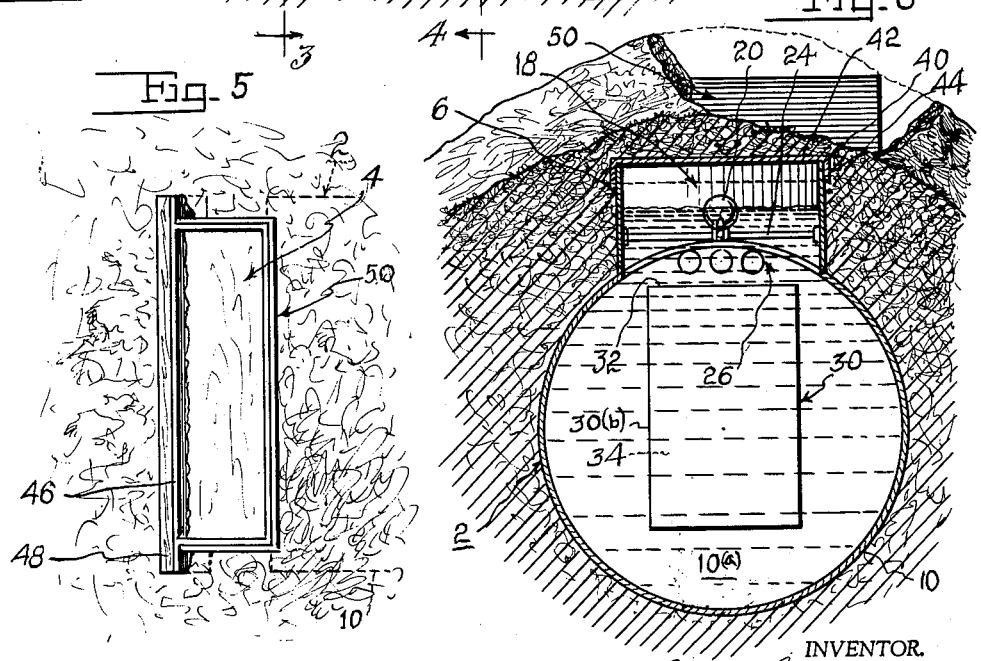
FIGURE 5 is a plan view of this left portion of the system as shown in FIGURE 1, FIGURE 5 presenting particularly the exposed watering trough or fountain; and, FIGURE 6 is a transverse sectional view taken on the line 6—6 of FIGURE 1 and presenting the preferred construction of components disposed within the system inlet chamber.

Referring more particularly to the drawings, in FIGURE 1, the overall system is shown as including a storage chamber generally designated by the numeral 2, a trough chamber generally designated by the numeral 4, and an inlet chamber generally designated by the numeral 6. The trough chamber, as shown in FIGURE 5, is elongate in horizontal section and disposed adjacent the upper left end of the storage chamber 2. The storage chamber 2 preferably comprises a cylindrical tank 10, sealed at both ends, except for certain passageway means provided in the end thereof adjacent the trough chamber, as explained more fully below.

The inlet chamber 6 is disposed in surrounding relation to an opening 12 in the top of the tank 10 whereby water entering the inlet chamber 6 passes into tank 10. Preferably the inlet chamber 6 is formed from sheet stock and welded to the tank 10 about the opening 12 therein.

The inlet chamber 6 is provided with an inlet coupling generally designated by the numeral 14 which may be of any conventional type. This coupling accommodates the end of a supply conduit 16 whereby water passed through the conduit 16 is fed into the chamber 6. Couplings adapted to serve this purpose are well known in the trade, and accordingly further description thereof appears unnecessary.

As suggested above, the system provided hereby incorporates means for automatically maintaining the water level therein at a predetermined height. For this purpose, as explained more fully below, there is provided a float actuated valve generally designated by the numeral 18. This valve, which is disposed within the inlet chamber 6, includes a float 20 and a valve assembly 22 operated by movement of the float and corresponding pivotal movement of the float arm 23 about the pivotal axis 24. Float actuated valves constructed and adapted to function in this manner are well known to those skilled in the art, and it is to be understood, that any suitable float actuated valve can be incorporated without departing from the scope and spirit of the invention.

Having now set forth the basic components of the system which is the subject of the instant application, attention can be directed to the matter in which circulation is automatically established therein upon existence of a temperature differential. If reference is made to FIGURE 4, it will be noted that at the upper portion of the end of the tank 10, the forward end as shown in FIGURE 4, and the left end as shown in FIGURE 2, there are provided two groups of apertures generally designated by the numerals 26 and 28 respectively. The apertures of the group designated by the numeral 28 are disposed at a lower vertical level than the apertures of the group designated by the numeral 26. Moreover, the apertures in the respective groups are of identical size, and in the embodiment shown, three apertures make up the group 26, whereas four apertures make up the group 28. However, such apertures need not be of identical size. The particular number of apertures is not important, but the relative fluid transfer areas provided by the groups of apertures are important as explained below.

By reference to FIGURE 2, it will be seen that the system includes a deflection means or baffle 30, closed at its upper end as at 32, which baffle means form with the forward with the forward end 10(a) of the tank 10 a channel 34 extending from the second group of aptertures 28 to the lower portion of the tank 10. This deflection means, deflection plate, or baffle is a channeled member having side walls 30(a) and 30(b) which are secured to the wall 10(a) whereby any fluid passing through the apertures of group 28 must pass inwardly of the deflection plate 30 to the bottom of the tank 10. It will be noted that the deflection plate 30 does not interfere in any way, but directs the fluid passing through the aperture 28 downwardly of the chamber 2.

While not specifically set forth above, it should be apparent that the apertures in the groups 26 and 28 referred to above extend not only through the forward wall 10(a) of the tank 10, but in addition, extend through the rear wall of the trough chamber 4 so that communication exists between the chambers through the respective groups of apertures. Moreover, while apertures have been shown, and while apertures are preferred for achieving the desired circulation, it will be understood that other forms of openings may be used to provide respectively first and second passageways disposed at different vertical levels and extending between the storage chamber 2 and the trough chamber 4.

In order to understand operation of the system, assume that the outside temperature, i.e., above ground temperature is below the temperature underground. In this instance, the fluid in the chamber 2, or at least near the base thereof, is warmer than the fluid in the trough chamber 4. Naturally, the warmer fluid tends to rise in the chamber 2. Similarly, the colder water in the trough chamber 4, being heavier, tends to sink. By virtue of the temperature differential, and the aforesaid inherent characteristics of the fluids due to the temperature differential, the colder fluid in the chamber 4 passes through the group of apertures 28, and the channel 34 to the base portion of the chamber 2. Simultaneously with this transfer, the warmer fluid passes from the chamber 2 through the group of apertures 26 and into the trough chamber 4. This operation is achieved merely due to the temperature differential and remains continuous as long as such temperature differential exists.

As an animal approaches the chamber 4, and drinks therefrom, naturally fluid is taken from the system. Thus, to maintain a constant level of fluid in the chamber 4, as desired, the float valve 18 is incorporated. As the level in the chamber 4 decreases by virtue of the communication thereof with the chamber 2, and the communication between the chamber 2 and the inlet chamber 6, the level of liquid in the chamber 6 also decreases. The float 20 thus vertically decends in response to the change in level, and as a result the valve 22 opens thereby allowing a fresh supply of water to enter the inlet chamber 6 through the supply conduit 16. As water is supplied to the system, the level again builds up to the predetermined height and thereafter the float 20 serves to shut off the valve 22. Thus, automatically, the level of liquid in the system is constantly maintained, and when differentials in temperature exist, continuous circulation is achieved. It will be noted that the inlet chamber is disposed at the rear of the system whereas the fountain is disposed at the front thereof so that operating noise at the inlet chamber does not scare animals drinking at the fountain.

It will be further noted that in the system provided hereby, the inlet chamber extends vertically above the storage chamber 2. Similarly, the trough chamber extends vertically above the storage chamber 2. According, the storage chamber 2 is constantly filled with liquid and there is no tendency for oxidation within the system.

The inlet chamber 6 is preferably provided with a cover such as that designated by the numeral 40, and comprising a crown portion 42 and a skirt portion 44. The skirt portion 44 is adapted to snugly fit over the side walls of the inlet chamber 6, which is preferably rectangular in shape. Of course, the cover is detachable so that entry to the components submerged is readily permitted upon removal of the cover, and cleaning of the system can be simply achieved.

The trough chamber 4 is preferably provided with a slope forward wall 46 having a kick plate 48 carried thereon. The kick plate 48 may be formed of wood or other suitable protective material, but should be disposed so as to prevent damage to the trough per se the event an animal's foot comes in contact with the forward wall thereof. In addition, the kick plate serves to prevent dirt or other undesired waste from being accidentally kicked into the trough itself, and eliminates injury to animals due to accidental direct contact with the metal.

In addition to incorporating the kick plate, preferably the trough chamber of a system constructed in accordance herewith is provided with a triangular shield such as that designated by the numeral 50. This shield is formed from sheet stock having a generally rectangular rear section and generally triangular side sections extending forward thereof. The shield is attached to the side walls of the trough chamber 4, as by means of bolts 52, and serves to prevent accidental kicking of waste into the trough chamber from the rear, or the sides. Moreover, this shield protects the trough chamber from the normal hazards, and serves to prevent an animal from accidentally falling into the trough chamber. In essence, the shield serves to eliminate a movable cover which might otherwise be required, and by virtue of the stationary nature of the shield, damage to an animal and constant attention by an operator, are eliminated.

While the deflection means 30 has been referred to hereinabove by such term, as well as in terms of a baffle plate or the like, it will be understood that the same serves as a deflection shield to provide a passageway between the shield and the forward wall of the storage chamber 2, which passageway serves in turn to direct fluid leaving the trough chamber 4 toward the bottom of the storage chamber 2.

To insure circulation through this passageway, it has been found desirable to raise the forward end of the tank 10 providing the storage chamber 2 slightly above the rear end thereof—i.e., to raise the left end as shown approximately an inch above the right end as shown. This slight tilt yields more efficient operation. Another factor which contributes to efficiency of operation is the unbalance of the respective passageways between the storage chamber and the trough chamber. Specifically, by again referring to FIGURE 4, it will be noted that the group of apertures 28 provides a larger flow or fluid transfer area than the group of apertures 26. This is obviously the case since three apertures 26 are provided, whereas 4 apertures 28 are provided. This relative unbalance in the passageway has been found to increase the efficiency of circulation, and accordingly, it is an important feature of the instant invention.

While the trough chamber has been shown as being comparatively shallow with respect to the depth of the storage chamber, it is to be understood that any suitable trough chamber can be used without departing from the scope and spirit of the invention. Preferably, however, the trough chamber is constructed with a bottom wall 5 disposed intermediate the vertical center of the storage chamber 2, and with a rear wall 5(a) secured to the forward wall 10(a) of the storage chamber 2. In this manner, the trough chamber is adjusted in relative position with respect to the storage chamber during the fabrication of the system, and when the same is submerged below ground, no subsequent adjustment is required.

Although reference has only been made summarily to the materials used in the formation of the component parts of the system, it should be readily apparent to those of ordinary skill in the art that metal sheet stock lends itself to the fabrication of the trough chamber, the inlet chamber, and the deflection shield, and that any suitable storage tank can be utilized for the chamber 2. Regardless of the material used, however, in accordance with the invention all of the components are preferably coated with a non-reflecting paint so that such components readily absorb all of the heat in the surrounding earth. It will be remembered that system operation is achieved due to temperature differentials of fluid within the system, and accordingly, the use of a non-reflective paint permits absorption of all heat in surrounding ground and the resulted operation with minimum temperature differentials.

One additional feature of particular importance with respect to the instant invention concerns the fact that all of the components thereof are submerged below ground so that the only exposed portion is the trough chamber itself, and the protective shield cooperating therewith. The cover 40 for the inlet chamber has been shown in FIGURE 1 as disposed under an overfill or backfill pile 25. Removal of the cover, however, can be easily achieved by virtue of the removable construction thereof explained above.

After reading the foregoing detailed description of the illustrative and preferred embodiments presented in the annexed drawings, it should be apparent that the construction provided hereby achieves all of the objects set forth at the outset of the present specification. Of course, various modifications may occur to those of ordinary skill in the art which do not depart from the scope and spirit of the invention, and accordingly.

What is claimed is:

1. A chambered fluid circulation system adapted to provide for automatic circulation of fluid therein due solely to thermal differences in fluid therein, said system comprising a storage chamber, a trough chamber having a portion thereof extending vertically above said storage chamber, an inlet chamber extending vertically above and communicating with said storage chamber, first passageway means for communicating a first vertical level of said trough chamber with a first vertical level of said storage chamber, second passageway means for communicating a second and higher vertical level of said trough chamber with a second and higher vertical level of said storage chamber, said first and second vertical levels of said storage chamber being spaced apart by a substantially greater distance than said first and second levels of said trough chamber, said first passageway means being dimensioned to offer less resistance to fluid flow therethrough than said second passageway means, whereby when said inlet chamber is filled with liquid to a level above said storage chamber, said trough chamber is filled to said last mentioned level, said storage chamber is completely filled, and when the liquid in said trough chamber has a temperature different than the temperature of liquid in said storage chamber, liquid circulates from said storage chamber through said second passageway means to said trough chamber, and from said trough chamber through said first passageway means to said storage chamber.

2. A chambered fluid circulation system as defined in claim 1 and further including a fluid input coupling for said inlet chamber and float actuated fluid valve means disposed in said chamber for opening and closing said coupling to maintain the fluid in said inlet chamber above a predetermined level.

3. A chambered fluid circulation system as defined in claim 1 wherein said trough chamber is fixed to one vertical wall of said storage chamber, said first and second passageway means comprise apertures extending between the inner face of said wall and the adjacent inner face of said trough chamber, and said first passageway means further includes a deflection shield fixed to said wall and defining therewith a passageway communicating the apertures of said first passageway means directly only with said first vertical level.

4. A chambered fluid circulation system as defined in claim 3 wherein the apertures of said first passageway means cumulatively provide a greater fluid transfer area than the apertures of said second passageway means.

5. A chambered fluid circulation system as defined in claim 1 and further including a fluid input coupling for said inlet chamber, and float actuated fluid valve means disposed in said chamber for opening and closing said coupling to maintain the fluid in said inlet chamber above a predetermined level, and wherein said trough chamber is fixed to one vertical wall of said storage chamber, said first and second passageway means comprises apertures extending between the inner face of said wall and the adjacent inner face of said trough chamber, and said first passageway means further includes a deflection shield fixed to said wall and defining therewith a passageway communicating the apertures of said first passageway means directly only with said first vertical level.

6. A chambered fluid circulation system as defined in claim 5 wherein said deflection shield comprises a channel type member closed across the upper end thereof.

7. An underground chambered fluid circulation system adapted to provide for automatic circulation of fluid therein due solely to thermal differences in fluid therein, comprising a storage chamber disposed underground, a trough chamber means having an exposed open end, said trough chamber means being disposed adjacent the upper end of one vertical wall of said storage chamber, said trough chamber having a bottom wall disposed intermediate the vertical center and top end of said storage chamber, said trough chamber extending vertically above the top of said storage chamber, said trough chamber communicating with said storage chamber through vertically spaced apart upper and lower openings in adjacent walls thereof, a diffusion shield disposed in adjacent spaced relation to said one vertical wall of said storage chamber, said diffusion shield and said one wall providing a passageway between the lower of said openings and the portion of said storage chamber below the vertical center thereof, said upper opening providing a smaller fluid transfer area than said lower opening, an underground inlet chamber disposed at the top of said storage chamber and extending thereabove, said inlet chamber communicating with said storage chamber, and having a removable cover disposed at least substantially at ground level, a fluid input coupling for said inlet chamber, and float actuated valve means disposed in said chamber for opening and closing said coupling to maintain the fluid in said inlet chamber above a predetermined level.

8. An underground fluid circulation system as defined in claim 7 and further including a triangular shield extending above said trough chamber.

9. An underground fluid circulation system as defined in claim 7 wherein said upper and lower openings comprise upper and lower groups of apertures, said upper group of apertures cumulatively providing a smaller fluid transfer area than the apertures of said lower group.

References Cited in the file of this patent

UNITED STATES PATENTS

| | | |
|---|---|---|
| 1,446,493 | Belden | Feb. 27, 1923 |
| 1,521,804 | Dougherty | Jan. 6, 1925 |
| 1,553,739 | Belden | Sept. 15, 1925 |
| 1,782,350 | Hupp | Nov. 18, 1930 |
| 1,835,352 | Stangl | Dec. 8, 1931 |